(12) United States Patent
Junca

(10) Patent No.: US 6,357,983 B1
(45) Date of Patent: Mar. 19, 2002

(54) DEVICE FOR AUTOMATICALLY STORING BIOLOGICAL OR CHEMICAL SAMPLES

(75) Inventor: Serge Junca, Maspie (FR)

(73) Assignee: Groupe Industriel de Realisations et Applications, Morlaas (FR)

( * ) Notice: Subject to any disclaimer, the term of this patent is extended or adjusted under 35 U.S.C. 154(b) by 0 days.

(21) Appl. No.: 09/445,467
(22) PCT Filed: Apr. 20, 1999
(86) PCT No.: PCT/FR99/00926
  § 371 Date: Dec. 21, 1999
  § 102(e) Date: Dec. 21, 1999
(87) PCT Pub. No.: WO99/54238
  PCT Pub. Date: Oct. 28, 1999

(30) Foreign Application Priority Data

Apr. 22, 1998 (FR) .............................................. 98 05281

(51) Int. Cl.[7] .............................. B65G 1/12; B65G 1/133
(52) U.S. Cl. .............. 414/331.03; 414/280; 414/331.05
(58) Field of Search ........................ 414/331.2, 331.01, 414/331.02, 331.03, 331.05, 280

(56) References Cited

U.S. PATENT DOCUMENTS

| | | |
|---|---|---|
| 3,456,817 A | 7/1969 | Irazoqui |
| 4,232,988 A | 11/1980 | Kochanneck |
| 4,252,488 A | 2/1981 | Kochanneck |
| 4,726,725 A | 2/1988 | Baker et al. |
| 4,867,629 A * | 9/1989 | Iwasawa et al. ........ 414/331.05 |
| 4,981,409 A * | 1/1991 | Hirose et al. ....... 414/331.01 X |
| 4,986,715 A | 1/1991 | Asakawa |
| 5,285,333 A * | 2/1994 | Barr et al. .......... 414/331.01 X |

FOREIGN PATENT DOCUMENTS

| | | |
|---|---|---|
| EP | 0005169 | 11/1979 |
| EP | 799776 | 10/1997 |

* cited by examiner

Primary Examiner—Steven A. Bratlie
(74) Attorney, Agent, or Firm—Greenblum & Bernstein, P.L.C.

(57) ABSTRACT

Automatic storing device comprising a storage container for storing objects in a plurality of locations which locations are defined by one of housings and shelves arranged side-by-side and on a plurality of levels. A device is provided for loading and unloading the objects into and out of the locations. The device for loading and unloading the objects comprises a platform for supporting an object. A mechanism is also provided for moving the platform from one level to another. A pair of pliers adapted to grip an object is provided. The pliers comprise two parallel pivoting branches. Each of the two branches is pivotally mounted and has a free end adapted to grip the object. A first moving mechanism adapted to move the two branches in the same direction is provided. A second moving mechanism adapted to move the two branches towards and away from each other is also provided. Each of the free ends of the two branches comprises a mechanism for allowing the free ends to move on the platform when the two branches are moved in the same direction. The first moving mechanism is freely movably mounted to the device for loading and unloading the objects.

27 Claims, 3 Drawing Sheets

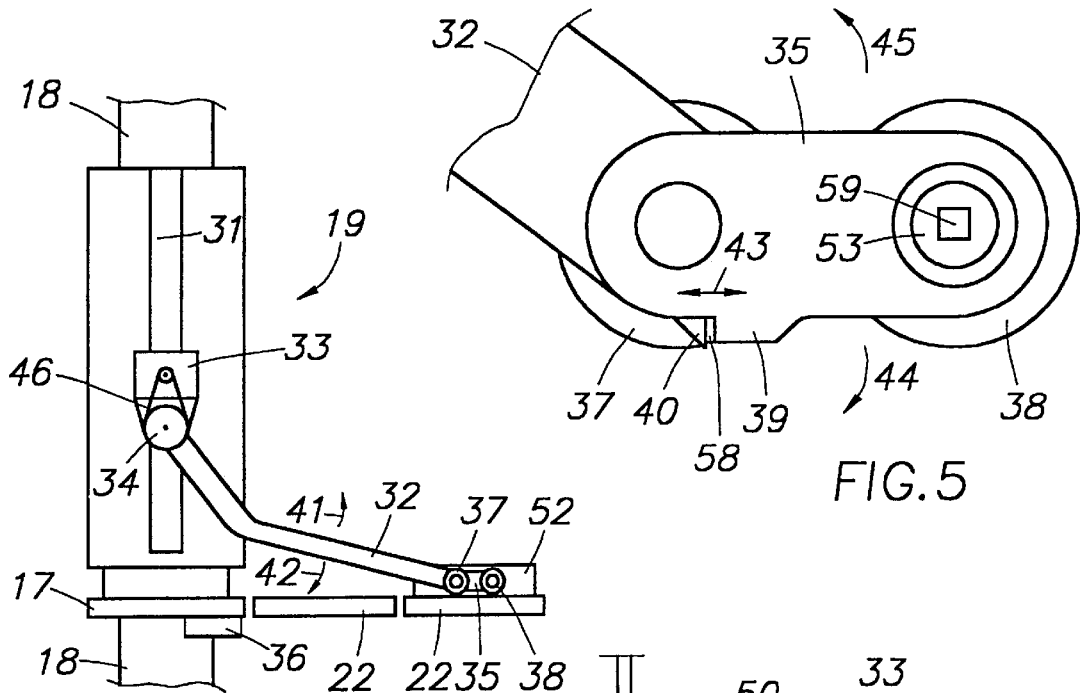
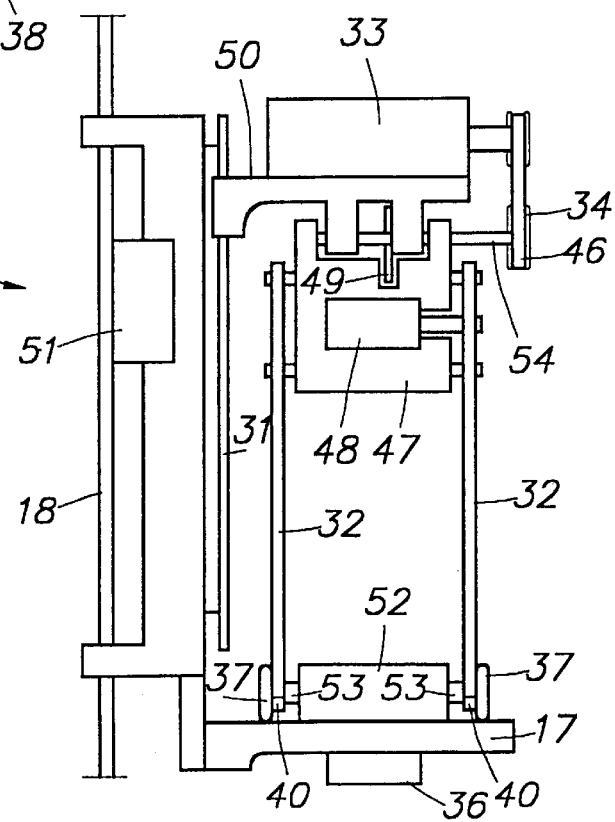
FIG. 3
FIG. 5
FIG. 4

DEVICE FOR AUTOMATICALLY STORING BIOLOGICAL OR CHEMICAL SAMPLES

CROSS-REFERENCE TO RELATED APPLICATIONS

The present application is a National Stage Application of International Application No. PCT/FR99/00926, filed Apr. 20, 1999. Further, the present application claims priority under 35 U.S.C. § 119 of French Patent Application No. 98/05281 filed on Apr. 22, 1998.

BACKGROUND OF THE INVENTION

1. Field of the Invention

The present invention relates to a device for storing a very large number of samples.

The invention relates primarily, but not exclusively, to the pharmaceuticals, cosmetics and biotechnology industries, which accumulate and manipulate large numbers (as many as several million) of biological and chemical samples for the development of new products.

2. Description of Background and Relevant Information

Under such circumstances, the ability to store and archive samples for long periods of time in a quickly accessible manner under the proper physical and chemical conditions for preserving the samples would seem to be a necessity.

Currently available storing devices use conventional storage techniques: cabinets and drawers. Such devices do not lend themselves to quick, automatic access to the samples they contain. They are also very expensive and require special laboratory facilities. Specifically, when samples need to be stored under special conditions, a room must be specially equipped for such purpose. Such devices are not modular, moreover, so their storage capacity cannot be expanded.

Cylindrical storage containers having several ring-shaped shelves on multiple levels are also known. However, such containers do not utilize efficient and reliable automatic devices for loading and unloading, even where the device has several concentric, ring-shaped shelves on the same level.

SUMMARY OF THE INVENTION

The invention resolves the problems described above by providing an automatic storing device which utilizes a storage container with multiple housings for the objects being stored, arranged side-by-side on a plurality of levels.

The device according to the invention is characterized in that it comprises a device for loading and unloading. The device is mobile from one housing to another and comprises a platform for receiving an object being loaded or unloaded. The device also includes a mechanism for moving the platform from one level to another. Also included are pliers to grip an object being loaded or unloaded. The pliers are provided with two parallel pivoting branches, each comprising one free end and one end interlocked in rotation about a horizontal axle shared by the two branches. The device also includes a mechanism for driving the branches in rotation about the horizontal axle and further includes a mechanism for spacing or bringing closer the respective free ends of the branches. The free ends of the branches are each provided with respective rollers for rolling on the platform when the branches are driven in rotation. The mechanism for driving the branches in rotation and the horizontal axle is freely mobile along a vertical axle integral with the platform, and can move along the vertical axle by gravity and by the rotational driving of the branches.

Thus, the invention utilizes a relatively simple mechanism to rotate the pliers that grip the objects in storage, or to be stored, through a broad range of motion, thereby enabling them to reach objects relatively far away from the horizontal axle of the branches. By moving vertically, moreover, the pliers can have shorter branches and need less space to move. In addition, the pliers can move symmetrically with respect to a vertical plane passing through the horizontal rotation axis of its branches, thereby enabling the device for loading and unloading to move objects, in a single rotational movement, from a stored position in a housing to a position accessible from outside the container.

The housings within the storage container can advantageously be arranged on ring-shaped shelves attached to two concentric cylinders, i.e., an outer cylinder and an inner cylinder, each cylinder being driven independently in rotation about their longitudinal axis; the platform for loading and unloading being mobile along a vertical axis tangential to the outer cylinder.

Such a container offers large storage capacity with minimum volume, since the fact that the pliers for gripping the objects in storage, or to be stored, can swing through a wide range makes them perfectly suited to reach both the housings on the outer cylinder and those on the inner cylinder. All that is required is to leave a column of housings empty on the outer cylinder, so the object gripped by the pliers can slide from one housing to another, and onto the platform.

It is difficult, however, to adjust the respective levels of the housings on the two cylinders so they match up perfectly. As a result, the slightly different levels can prevent the object gripped by the pliers from sliding from one housing to another, facing housing on the other cylinder that is slightly higher.

To solve this problem, the free end of the branches of the pliers is provided with a jaw, which pivots about the rotation axis of the roller and has a pad with a high friction factor that rests against the object being gripped, and a beveled shoe that, when it encounters a difference in level, causes the jaw to pivot upward and lift the gripped object slightly.

Alternatively, each jaw has a finger that rests against the object being gripped, the finger pivoting within a plane perpendicular to the longitudinal axis of the jaw, to lift the object slightly by pivoting when the pliers close around the object.

The invention further provides for an automatic storing device comprising a storage container for storing objects in a plurality of locations. The locations are defined by one of housings and shelves arranged side-by-side and on a plurality of levels. A device for loading and unloading the objects into and out of the locations is provided. The device for loading and unloading the objects comprises a platform for supporting an object. A mechanism for moving the platform from one level to another is also provided. A pair of pliers adapted to grip an object is provided. The pliers comprise two parallel pivoting branches. Each of the two branches is pivotally mounted and has a free end adapted to grip the object. A first moving mechanism adapted to move the two branches in the same direction is provided. A second moving mechanism adapted to move the two branches towards and away from each other is also provided. Each of the free ends of the two branches comprises a mechanism for allowing the free ends to move on the platform when the two branches are moved in the same direction. The first moving mechanism is freely movably mounted to the device for loading and unloading the objects.

Each of the two branches may be pivotally mounted to an axle that is oriented horizontally. The second moving mechanism may be adapted to move the free ends of the two branches horizontally towards and away from each other. The first moving mechanism may be freely movably mounted to an axle that is oriented vertically. The axle may be arranged on the device for loading and unloading the objects and the device for loading and unloading the objects may be vertically movably mounted. The axle may be integral with the platform. The first moving mechanism may be freely movable upwardly when the two branches are pivoted in one direction and the first moving mechanism may be freely movable downwardly when the two branches are pivoted in an opposite direction. The locations may be arranged in two concentrically arranged cylinders or carousels. Each of the cylinders or carousels may be at least one of independently and rotatably driven. At least some of the locations on an inner cylinder or carousel may comprise horizontal surfaces which are one of slightly lower and slightly different than corresponding horizontal surfaces of an outer cylinder or carousel.

The storage container may comprise a base for supporting the inner and outer cylinders or carousels. The automatic storing device may further comprise one of an air conditioning system and a system for circulating air within the storage container. Each of the free ends of the two branches may comprise a mechanism for lifting the object, the mechanism for lifting the object being adapted to at least lift the object slightly. Each of the free ends of the two branches may comprise a jaw. Each jaw may be one of movably and pivotally mounted and may comprise a mechanism for frictionally engaging the object. The mechanism for allowing the free ends to move on the platform when the branches are moved in the same direction may comprise a roller. Each of the free ends of the two branches may comprise a shoe which includes a ramp, the shoe being movable and being biased by a spring. Each of the free ends of the two branches may comprise a jaw and a pivotally mounted finger adapted to engage the object, whereby the finger is adapted to lift the object slightly.

The automatic storing device may further comprise a spring disposed between the finger and the free end. The mechanism for allowing the free ends to move on the platform when the branches are moved in the same direction may comprise two rollers arranged on each free end, the two rollers being arranged in the vicinity of a pivoting jaw which is coupled to each free end. The storage container may comprise an opening and the automatic storing device may further comprise a movable insertion and removal platform which is adapted to move between a closed position and an open position. The insertion and removal platform may comprise a mechanism for detecting when an object is disposed thereon. The device for loading and unloading the objects may further comprise an optical reader, whereby the optical reader is adapted to read optical codes disposed on the objects. The device for loading and unloading the objects may further comprise a mechanism for detecting the object, whereby the mechanism for detecting the object is adapted to detect the presence of the object between the two branches. The mechanism for detecting the object may be arranged in the vicinity of the pliers.

The invention also provides for an automatic storing device comprising a storage container for storing objects in a plurality of locations. The locations are defined by one of housings and shelves. A vertically movable device for loading and unloading the objects into and out of the locations is provided. The device for loading and unloading the objects comprises a platform for supporting an object. A pair of pliers is coupled to the device for loading and unloading the objects. The pair of pliers is adapted to grip an object and comprises parallel pivoting branches. Each of the branches is pivotally mounted and has a free end adapted to grip the object. A mechanism for moving the branches into and out of each of the locations is provided. A mechanism for moving the branches towards and away from each other is provided. Each of the free ends of the branches comprises a mechanism for allowing the free ends to move on the platform when the branches are moved into and out of the locations. The mechanism for moving the branches into and out of the locations is freely movably mounted to the device for loading and unloading the objects.

The invention also provides for an automatic storing device comprising a storage container for storing objects in a plurality of locations disposed in two concentrically arranged carousels. A vertically movable device for loading and unloading the objects into and out of the locations is provided. The device for loading and unloading the objects comprises a platform for supporting an object and a pair of pliers. The pair of pliers is adapted to grip an object and comprises pivoting branches. Each of the branches is pivotally mounted and has a free end adapted to grip the object. A mechanism for moving at least one of the free ends of the branches into and out of at least one of the locations is provided. A mechanism for moving at least one of the branches towards and away from the other is also provided.

At least one of the free ends of the branches comprises a mechanism for allowing the free end to move on the platform when the branches are moved into and out of at least one of the locations. The mechanism for moving at least one of the free ends of the branches into and out of at least one of the locations is freely movably mounted to the device for loading and unloading the objects.

BRIEF DESCRIPTION OF THE DRAWINGS

One embodiment of the device according to the invention is described below for illustrative purposes, not to be taken as limiting the scope of the invention, with reference to the accompanying drawings, wherein:

FIGS. 3 and 4 are detail views of the device for loading and unloading according to the invention, shown from the front and side, respectively;

FIG. 5 is a detail view of the inside of the free end of a branch of the pliers shown in FIGS. 3 and 4;

DETAILED DESCRIPTION OF THE INVENTION

Figure 1:
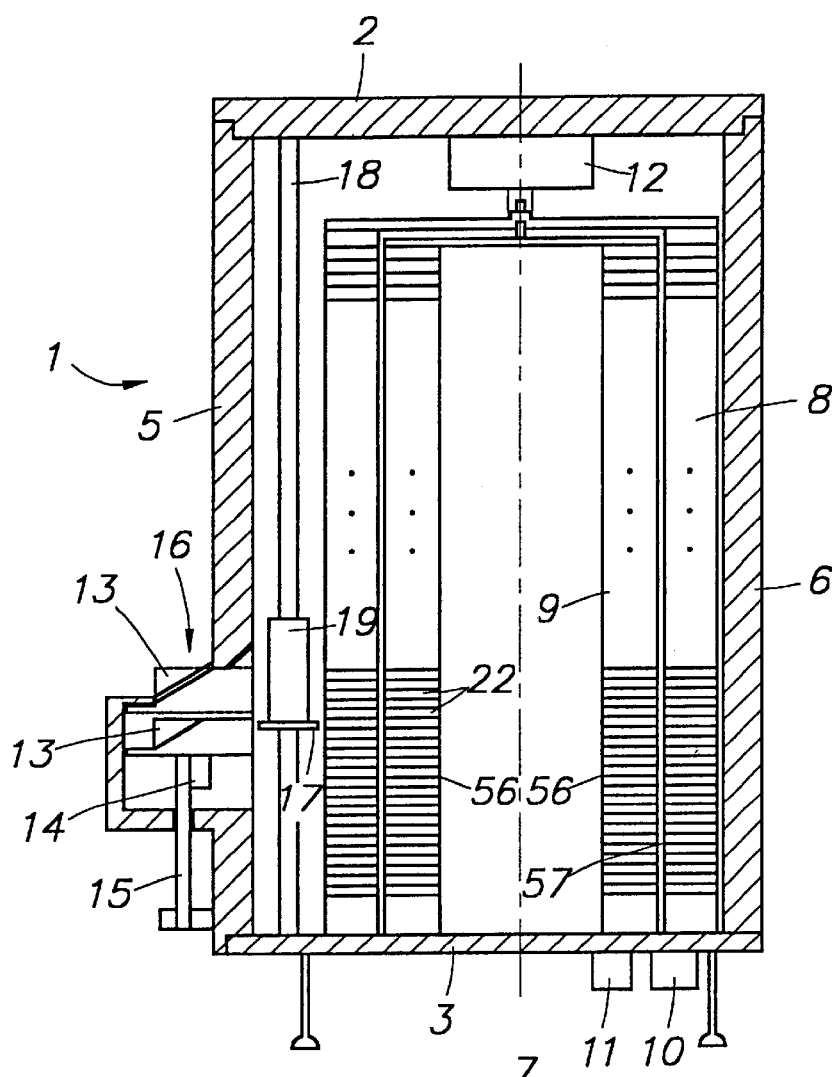
FIG. 1 is a longitudinal section view of the device according to the invention.
Figure 2:
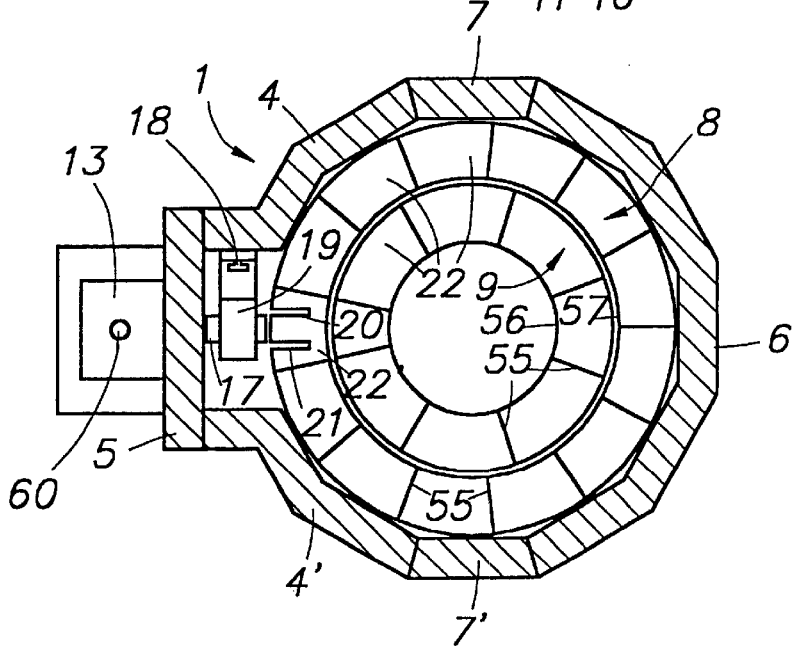
FIG. 2 is a cross-sectional view of the device shown in FIG. 1.

FIGS. 1 and 2 show a storage container 1 having a tubular shape with a polygonal cross-section, assembled from a plurality of panels, i.e., a top panel 2, a bottom panel 3, and side panels 4, 4', 5, 6, 7, 7'. Inside the container are multiple housings on a plurality of ring-shaped shelves 22, arranged one on top of the other and attached to one another on the outside of a cylinder 56, 57, to form two separate, concentric carousels 8, 9, i.e., an inner carousel 9 and an outer carousel 8. These two carousels rotate about their longitudinal axes. Housings 22, on a given shelf, are separated from the adjacent housings by partitions 55.

The two concentric carousels 8, 9 are positioned with respect to one another, such that their respective shelves 22 are substantially at the same level.

The container 1 is mounted on a base that houses direct- or alternating-current motors 10, 11 which drive the two carousels 8, 9 in rotation. The positions of the carousels 8 and 9 are indexed using coders, e.g., optical or magnetic (not shown in the figures).

The motors are designed to complete one rotation in, for example, less than 10 seconds, so any housing can be accessed within 5 seconds if the motors are bi-directional.

The vertical spacing between two shelves can be adjusted to suit the height of the object being stored.

To insert or remove an object from the container 1, a horizontal opening 16 at a set height has been provided in the wall of the container. The opening 16 is normally blocked by an insertion/removal platform 13, which thus also acts as a door. The opening opens and closes as the platform 13 moves along a vertical axis 15. The platform is moved automatically by a motor 14 when a command is given. Thus, the platform 13 moves between two positions, i.e., a low, open position shown in solid lines in FIG. 1, in which the extractor 19 can transfer an object from platform 13 to platform 17, and a high, closed position shown in dotted lines, in which it blocks the opening 16 in the container 1.

In the open position, the platform 13 is accessible to the extractor 19, which can pick up or place an object on it. In the closed position, the platform 13 can receive an object to be introduced into the container 1, or make an object just removed from the container 1 accessible from the outside. For such purpose, the platform 13 is advantageously provided with a detector 60 for detecting an object on its upper surface.

An object is loaded or unloaded automatically using a processor running software that controls an extractor 19 on a platform 17 inside the container 1, which moves vertically and tangentially to the outer carousel 8, to reach shelves at any level.

Platform 17, which receives objects for loading or unloading, moves along a vertical axis, for example via a motor 51 that turns rack-gearing or a notched belt 18, and can therefore reach all levels of shelves on the carousels 8, 9 and the level of the insertion/removal platform 13 of the container 1.

In FIGS. 3 and 4, the extractor 19 has a vertical rail 31 attached to the platform 17, and U-shaped pliers held by a carriage 50 which moves freely along the rail 31. The branches 32 of the pliers curve slightly inwardly toward the center of the storage container 1, and can partially close via an activation mechanism 48, such as an electromagnet or a motor, to grip an object 52. The base 47 of the U-shape formed by the pliers is attached to an axle 54 that rotates on the carriage 50. The axle 54 forms a single piece with a coaxial wheel 34, which is driven in rotation by, for example, a belt 46 driven in turn by a motor 33 attached to the carriage 50. Thus, the pliers are driven in rotation about the axle 54 in the direction of the arrows 41, 42 in FIG. 3. A thumbwheel 49 in association with an optical reader (not shown) can also be provided, for continuous reading of the angular position of the pliers.

As shown in detail in FIG. 5, each free end of the branches 32 of the pliers is provided with a respective, articulated jaw 35, which pivots about an axle parallel to axle 54 and has a freely rotating roller 37 mounted on it. This roller, made of a material such as rubber, rolls over the shelves 22 and platforms 17 and 13 to reduce friction as the pliers move. Its rotation axis coincides with the pivot axis of the jaw.

Each jaw 35 has a pad 53 with a high friction factor that rests against the object 52 being loaded or unloaded, and a shoe 39 provided with a ramp 40. When the shoe encounters a higher level, the ramp 40 causes the jaw 35 to pivot upwardly by leverage, lifting the object 52 held in the jaws of the pliers.

Thus, differences between the levels of the facing shelves of the two carousels 8, 9 and the platforms 13 and 17 create no problems for the extractor 19.

The end of each jaw 35 can be provided with a roller 38, also made of rubber, to reduce friction when the pliers move, the roller having a rotation axis parallel to that of roller 37.

The jaws 35 can be provided with a sensor, such as a pressure sensor, to detect an object gripped by the pliers.

The ramp 40 can advantageously move horizontally (in the direction of double-headed arrow 43) on a spring 58, to absorb any shocks while the free end of the pliers is in motion.

The respective heights of the two carousels 8, 9 are such that the shelves on the inner cylinder 9 are slightly lower than the facing shelves on the outer cylinder 8. This difference in level only constitutes an obstacle to movement of the pliers and the object gripped by the pliers when extracting an object from a housing 22 on the inner carousel 9. During such movement, the ramp 40 is activated and lifts the gripped object so it clears the difference in level without any danger of jamming.

Figure 7:
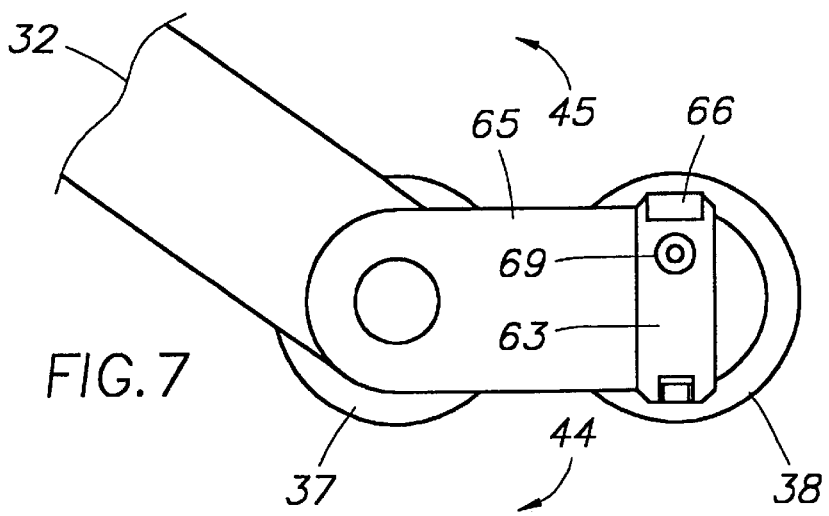
FIG. 7 is a detail view of the inside of the free end of a branch of the pliers according to an alternative embodiment of the invention.
Figure 8:
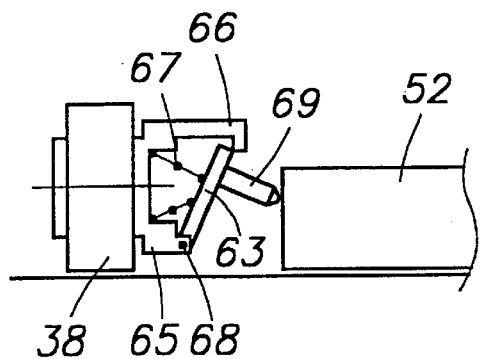
FIGS. 8 and 9 are side detail views of the free end of the branch of the pliers shown in FIG. 7, before and after an object is gripped by the pliers, respectively.
Figure 9:
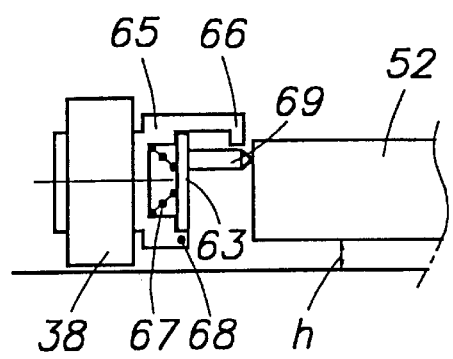

Alternatively, in FIGS. 7 to 9, each jaw 65 has a finger 69 on the side facing the opposing jaw, which extends within a plane perpendicular to the longitudinal axis of the jaw. The tip of the finger can have a high friction factor for gripping the object 52 being loaded or unloaded.

The finger 69 is positioned near the end of one branch 63, the other end of the branch being attached to the jaw 65, such that it pivots about an axle 68 substantially parallel to the longitudinal axis of the jaw, the axle being located at the lower edge of the jaw 65.

The branch is pushed away from the jaw via an elastic mechanism, such as a spring 67, and rests against a stop 66 on the upper edge of the jaw 65, sufficiently far away from the jaw for the finger 69 to point downwardly in a rest position (FIG. 8).

When the pliers close around an object 52 to be moved (FIG. 9), the branch 63 pivots about the axle 68, compressing the spring 67 and moving closer to the jaw 65, which causes the end of the finger 69 to pivot upward and lift the object 52 held between the jaws 65 of the pliers a certain height h by leverage. In that position, the respective fingers 69 of the two branches 62 of the pliers are substantially coaxial.

Figure 6:
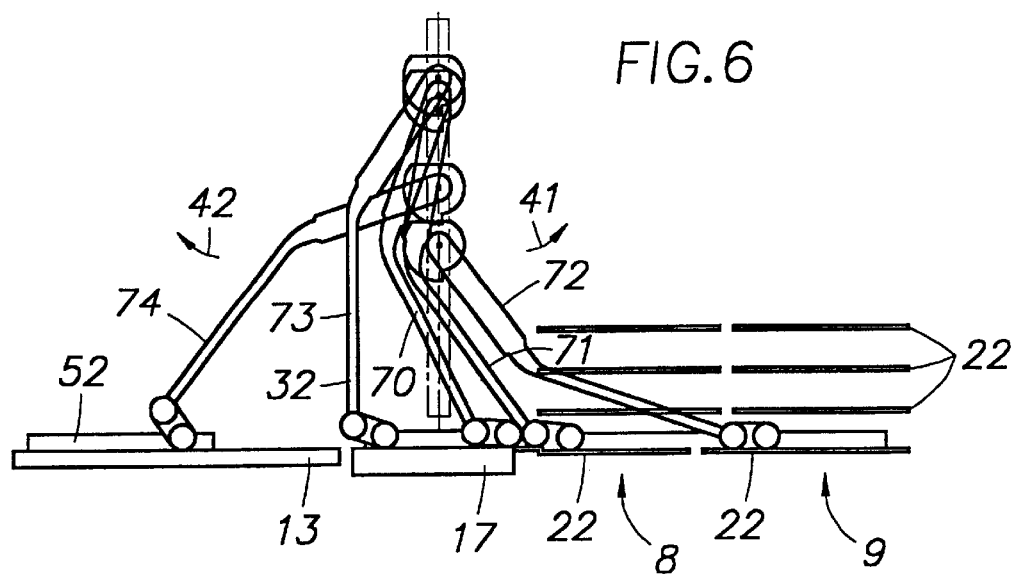
FIG. 6 shows several possible positions for the pliers, to illustrate how they move.

In FIG. 6, the branches 32 of the pliers in rest position 73 are substantially vertical, with the end rollers 37, 38 resting on the platform 17. When the motor 33 drives the pliers in rotation toward the center of the container 1 in the direction of the arrow 41 to position 70, the carriage 50 tends to move down along the rail 31 by its own weight, while the rollers 37 at the ends of the branches 32 of the pliers roll horizontally over the platform 17, a shelf 22 facing the outer carousel 8 (position 71), and possibly the shelf 22 facing the inner carousel 9 (position 72), if the motor continues to rotate. As the pliers rotate in the opposite direction, in the direction of arrow 42, the driving force of the motor 33 causes the carriage 50 to re-ascend the rail 31 until the rollers 37 at the ends of the branches 32 of the pliers return to the platform 17 (position 73), and then re-descend if the pliers 32 are oriented toward the outside of the container 1. This last movement occurs when the platform 17 of the extractor 19 is at the level of the insertion/removal platform 13 of the container 1 (position 74).

This figure shows, therefore, that the pliers 32 of the extractor 19 according to the invention can reach any shelf on either carousel 8, 9. However, for the shelves on the inner carousel 9 to be accessible, one housing 22 on each level of the outer carousel 8 must be left empty, so objects can move between the platform 17 of the extractor 19 and the shelves 22 of the inner carousel 9. In addition, if the spacing between the shelves is insufficient from one level to the next for the branches 32 of the pliers to reach a housing on the inner carousel 9, the shelves on the level of the housings 22 of the outer carousel 8 can be provided with two slots 20, 21 for the branches 32 of the pliers to pass through (FIG. 2). The branches 32 of the pliers can also be curved slightly toward the center of the container, as shown specifically in FIG. 6, so there are two straight sections at an obtuse angle to one another.

To load or unload an object, motors 51, 33, 48, 14, 10 and 11 are controlled concurrently by control software, significantly reducing loading and unloading time.

In addition, the software that controls the pliers is advantageously designed to position the fingers 59 and 69, so they grip an object 52 near its edge on the side of the direction in which the object is to be moved. Thus, to move an object and insert it into the container 1, the pliers grasp the object near the edge closest to the center of the container (position 74), which has the effect of lifting that edge. To move in the opposite direction, the pliers grasp the object near the edge closest to the outside of the container (positions 71 to 73), which has the effect of lifting the object on the side of that edge. Thus, there is no danger of slight differences in the levels of facing shelves on the two carousels 8, 9 and the platforms 13 and 17 hindering the movement of the object 52 as it is transported by the pliers.

A counterweight system can be provided, attached for example by a cable supported by pulleys (not shown) or springs whose tension increases as the branches 32 move away from the vertical position, to lighten the assembly consisting of the carriage 50, motor 33 and pliers, thereby reducing the power that has to be generated by the motor 33.

Advantageously, the height of the door 16 can be adjusted by the user, so the objects being stored appear at the outside of the container 1 at a height suited to the work environment or an automated system.

The carousels 8, 9 are self-supporting, i.e., they are not supported by the vertical walls 4, 4', 6, 7 and 7' of the container 1. The vertical walls can therefore be removed for easy access to the inside of the container, especially the first time the container is loaded or for maintenance.

The storing device according to the invention can be fully automated by installing on the extractor 19, for example under the platform 17, an optical reader 36 capable of reading and transmitting to the central processor optical codes printed on labels affixed to the stored objects. Thus, if the container 1 is loaded manually, a program to control the extractor 19 can be provided, which moves the extractor to all the locations 22 on the carousels 8, 9, to read the optical code on the objects in relation to their position within the container. The information is transmitted to the central processor, which stores it in a database. Thus, the user does not need to know location of each object. To get a particular container, the user simply enters its code, and a processor sends the extractor 19 to the position corresponding to the code of the requested object, as it appears in the database.

Such a storing device is especially suited to storing objects which require controlled physical and chemical conditions, such as biological or chemical samples.

For such purpose, an air conditioning system 12 that controls the storage parameters, i.e., temperature and humidity inside the container, can be provided in the top section of the container 1. The system also filters and circulates the ambient gas, which may be air or another gas, such as an inert gas like nitrogen or argon.

The size of the opening 16 is small, to limit gaseous exchanges between the inside of the container and the outside, and keep internal storage conditions stable.

The walls 2, 3, 4, 4', 5, 6, 7 and 7' of the container 1 consist of a double shell, which thermally insulates the interior of the container, so the temperature inside can remain constant for several hours if the air conditioning system fails.

The air conditioning system 12 can be used to set the internal temperature anywhere between −20 and +20° C. The air can be dehydrated before it is sent to the container, to limit the risk of frost forming at temperatures near or below 0° C. The air sent to the container is also filtered to prevent contamination of the samples stored in the container.

The air conditioning system 12 also continuously circulates the air inside the container 1 for homogeneous temperature distribution at all levels. Specifically, the air circulates downwardly through the central tube 56 and is diverted radially at each level. For such purpose, the central tubes or cylinders 56 and 57 have a plurality of openings for air to pass through. When the air reaches the walls of the container, it is aspirated upwardly by the system 12.

No outside air can get in, therefore, since the air is diverted outward from the center of the container 1, pushing the air out of the container through the joints in its walls and when the door is opened.

Such air circulation also pressurizes container slightly (a few millibars), which also prevents any outside air getting in.

In a typical embodiment of the invention, the storing device is used to store chemical compounds stored in microtitre plates having a plurality of compartments. The processor can be connected to a computer network, making it accessible from several points. The storing device is also linked to an automated system that can pick up and return the microtitre plates at the container door, so preparations can be made by mixing the compounds contained in the microtitre plates stored in the container.

What is claimed is:
1. An automatic storing device comprising:
   a storage container for storing objects in a plurality of locations, the locations being defined by one of housings and shelves arranged side-by-side and on a plurality of levels;
   a device for loading and unloading the objects into and out of the locations;

the device for loading and unloading the objects comprising a platform for supporting an object;

a mechanism for moving the platform from one level to another;

a pair of pliers adapted to grip an object, the pliers comprising two parallel pivoting branches, each of the two branches being pivotally mounted and having a free end adapted to grip the object;

a first moving mechanism adapted to move the two branches in the same direction;

a second moving mechanism adapted to move the two branches towards and away from each other; and each of the free ends of the two branches comprising a mechanism for allowing the free ends to move on the platform when the two branches are moved in the same direction, wherein the first moving mechanism is freely movably mounted to the device for loading and unloading the objects.

2. The automatic storing device of claim 1, wherein each of the two branches is pivotally mounted to an axle that is oriented horizontally.

3. The automatic storing device of claim 2, wherein the second moving mechanism is adapted to move the free ends of the two branches horizontally towards and away from each other.

4. The automatic storing device of claim 1, wherein the first moving mechanism is freely movably mounted to an axle that is oriented vertically.

5. The automatic storing device of claim 4, wherein the axle is arranged on the device for loading and unloading the objects and wherein the device for loading and unloading the objects is vertically movably mounted.

6. The automatic storing device of claim 5, wherein the axle is integral with the platform.

7. The automatic storing device of claim 1, wherein the first moving mechanism is freely movable upwardly when the two branches are pivoted in one direction and wherein the first moving mechanism is freely movable downwardly when the two branches are pivoted in an opposite direction.

8. The automatic storing device of claim 1, wherein the locations are arranged in two concentrically arranged cylinders or carousels.

9. The automatic storing device of claim 8, wherein each of the cylinders or carousels is at least one of independently and rotatably driven.

10. The automatic storing device of claim 8, wherein at least some of the locations on an inner cylinder or carousel comprise horizontal surfaces which are one of slightly lower and slightly different than corresponding horizontal surfaces of an outer cylinder or carousel.

11. The automatic storing device of claim 10, wherein the storage container comprises a base for supporting the inner and outer cylinders or carousels.

12. The automatic storing device of claim 1, further comprising one of an air conditioning system and a system for circulating air within the storage container.

13. The automatic storing device of claim 1, wherein each of the free ends of the two branches comprises a mechanism for lifting the object, whereby the mechanism for lifting the object is adapted to at least lift the object slightly.

14. The automatic storing device of claim 1, wherein each of the free ends of the two branches comprises a jaw.

15. The automatic storing device of claim 14, wherein each jaw is one of movably and pivotally mounted and comprises a mechanism for frictionally engaging the object.

16. The automatic storing device of claim 1, wherein the mechanism for allowing the free ends to move on the platform when the branches are moved in the same direction comprises a roller.

17. The automatic storing device of claim 1, wherein each of the free ends of the two branches comprises a shoe which includes a ramp, the shoe being movable and being biased by a spring.

18. The automatic storing device of claim 1, wherein each of the free ends of the two branches comprises a jaw and a pivotally mounted finger adapted to engage the object, whereby the finger is adapted to lift the object slightly.

19. The automatic storing device of claim 18, further comprising a spring disposed between the finger and the free end.

20. The automatic storing device of claim 1, wherein the mechanism for allowing the free ends to move on the platform when the branches are moved in the same direction comprises two rollers arranged on each free end, the two rollers being arranged in the vicinity of a pivoting jaw which is coupled to each free end.

21. The automatic storing device of claim 11, wherein the storage container comprises an opening and wherein the automatic storing device further comprises a movable insertion and removal platform which is adapted to move between a closed position and an open position.

22. The automatic storing device of claim 21, wherein the insertion and removal platform comprises a mechanism for detecting when an object is disposed thereon.

23. The automatic storing device of claim 1, wherein the device for loading and unloading the objects further comprises an optical reader, whereby the optical reader is adapted to read optical codes disposed on the objects.

24. The automatic storing device of claim 1, wherein the device for loading and unloading the objects further comprises a mechanism for detecting the object, whereby the mechanism for detecting the object is adapted to detect the presence of the object between the two branches.

25. The automatic storing device of claim 24, wherein the mechanism for detecting the object is arranged in the vicinity of the pliers.

26. An automatic storing device comprising:

a storage container for storing objects in a plurality of locations, the locations being defined by one of housings and shelves;

a vertically movable device for loading and unloading the objects into and out of the locations;

the device for loading and unloading the objects comprising a platform for supporting an object;

a pair of pliers coupled to the device for loading and unloading the objects, the pliers being adapted to grip an object and comprising pivoting branches, each of the branches being pivotally mounted and having a free end adapted to grip the object;

a mechanism for moving the branches into and out of each of the locations;

a mechanism for moving the branches towards and away from each other; and each of the free ends of the branches comprising a mechanism for allowing the free ends to move on the platform when the branches are moved into and out of the locations, wherein the mechanism for moving the branches into and out of the locations is freely movably mounted to the device for loading and unloading the objects.

27. An automatic storing device comprising:

a storage container for storing objects in a plurality of locations disposed in two concentrically arranged carousels;

a vertically movable device for loading and unloading the objects into and out of the locations;

the device for loading and unloading the objects comprising a platform for supporting an object and a pliers;

the pliers being adapted to grip an object and comprising pivoting branches, each of the branches being pivotally mounted and having a free end adapted to grip the object;

a mechanism for moving at least one of the free ends of the branches into and out of at least one of the locations;

a mechanism for moving at least one of the branches towards and away from another of the branches; and at least one of the free ends of the branches comprising a mechanism for allowing the free end to move on the platform when the branches are moved into and out of at least one of the locations, wherein the mechanism for moving at least one of the branches into and out of at least one of the locations is freely movably mounted to the device for loading and unloading the objects.

* * * * *